United States Patent [19]

Krambs

[11] Patent Number: 4,967,880
[45] Date of Patent: Nov. 6, 1990

[54] PROCESS AND APPARATUS FOR MONITORING LUBRICATING OIL WATER CONTENT FOR ROTARY PRINTING PRESSES

[75] Inventor: Werner Krambs, Dossenheim, Fed. Rep. of Germany

[73] Assignee: Heidelberger Druckmaschinen AG, Heidelberg, Fed. Rep. of Germany

[21] Appl. No.: 454,738

[22] Filed: Dec. 21, 1989

[30] Foreign Application Priority Data

Dec. 23, 1988 [DE] Fed. Rep. of Germany ....... 3843498

[51] Int. Cl.$^5$ .......................................... F01M 11/10
[52] U.S. Cl. .................................. 184/6.4; 184/103.2; 184/108
[58] Field of Search ...................... 184/6.1, 6.4, 103.1, 184/103.2, 7.4, 108

[56] References Cited

U.S. PATENT DOCUMENTS

| | | | |
|---|---|---|---|
| 2,792,912 | 5/1957 | Kangas | 184/103.2 |
| 3,782,501 | 1/1974 | Pagella | 184/6.4 |
| 4,146,474 | 3/1979 | Kagatani | 101/147 |
| 4,251,122 | 2/1981 | McCloskey | 308/72 |
| 4,367,440 | 1/1983 | Mazzagatti | 324/445 |
| 4,572,120 | 2/1986 | Matsumoto | 184/103.1 |

FOREIGN PATENT DOCUMENTS

| | | |
|---|---|---|
| 6914832 | 4/1969 | Fed. Rep. of Germany . |
| 0137493 | 6/1987 | Japan ................. 184/6.4 |
| 2194333 | 3/1988 | United Kingdom . |

Primary Examiner—Ira S. Lazarus
Assistant Examiner—Alan B. Cariaso
Attorney, Agent, or Firm—Nils H. Ljungman and Associates

[57] ABSTRACT

The invention relates to a monitoring process on machine assemblies with central lubrication in rotary printing presses, with such machine assemblies possibly being, for example, printing units, which have a multiplicity of bearing points, engaging teeth, crank drives and similar. Via a central lubrication system, the lubrication points are supplied with lubrication oil, which is then collected and is checked in a central oil-collection tank for the possible occurrence of water, before being supplied to the central lubrication system.

11 Claims, 4 Drawing Sheets

FIG. I

PROCESS AND APPARATUS FOR MONITORING LUBRICATING OIL WATER CONTENT FOR ROTARY PRINTING PRESSES

BACKGROUND OF THE INVENTION

1. Field of the Invention

The invention relates to a monitoring process on machine assemblies of rotary printing presses with central lubrication, with such machine assemblies being, for example, printing units. Such machine assemblies have a multiplicity of bearing points, engaging teeth, crank drives and similar structures, which, during operation, are supplied with the necessary quantity of lubricating oil in accordance with a specific lubrication schedule. Owing to the supply of oil to the individual lubrication points, often at pinpoint locations, only a relatively small quantity of lubrication oil is needed.

2. Description of the Prior Art

Normally, the supply of lubricant is usually slightly greater than the demand, which may possibly only be in the order of a few drops of lubricating oil. The demand will depend on the particular requirement of the lubrication point, such as a bearing. This slight oversupply of oil drips or flows away from the individual lubrication points and is collected in oil channels or other oil-collection reservoirs. Since, however, in certain machine assemblies in rotary printing presses, e.g. in printing units, there may be a system for the cooling of rollers in the associated inking unit. Therefore, the possibility cannot be discounted that leakage losses of the coolant from supply lines occur. If water is used as a coolant, the possibility cannot safely be ruled out that, for example, at a rotary connector for the supply of coolant, a few drops of water may escape after the machine has been in operation for some period of time. Unless the water is able to evaporate, these drops often may enter the lubrication oil as it flows or drips away from the mechanisms being lubricated and are collected together with the lubrication oil. There, then, is the danger that, when the collected oil flows from oil collection reservoirs into the supply tank of the central lubrication system, the drops of water will also flow to a lubrication point. In such a case, the machine part that is to be lubricated may be damaged during machine operation by the water that has been supplied to it via the lubricating system. Conventionally, the only reliable method of preventing contamination of the lubricating oil has been either to clean the collected oil or to totally remove the collected oil. The cleaning of the oil, or the discarding thereof, often represents a considerable cost factor for the operation of a rotary printing press.

OBJECT OF THE INVENTION

Proceeding from these circumstances, the object of the present invention is to monitor the lubrication oil collected from the lubrication points and returned by the central lubrication system for water content and then allow only that portion of the oil to be reused that does not contain water. This process should be executed at minimum cost and without creating the risk of bearing damage.

SUMMARY OF THE INVENTION

The object of the invention is achieved in that the lubrication oil supplied from a central oil supply and, hence, escaping from the bearing points is collected at the machine assemblies and is fed to a relatively large oil-collection tank. The collected oil is then fed to the oil-collection tank where the oil is initially directed to a smaller oil tank, from which, after this smaller tank has been filled, the oil overflows therefrom into the large tank. A sensor is provided in the smaller tank for generating a signal if there is water in the oil fed into said smaller oil tank. The oil that has flowed into the larger tank is then supplied by a pump to the central oil supply. Such a monitoring process with a central collection tank has the advantage that the printer need only collect lubrication oil in one location, that being the oil-collection tank. The passing of the oil, first of all, into a smaller oil tank in which a sensor is located, has the advantage that, if water contamination occurs in the lubricating oil, a signal is generated, which results in the contaminated oil not being fed to the central oil supply for further use. Oil collected in the larger tank is supplied by a pump to the oil tank of the central lubrication system, if the collected oil is not contaminated, with the result that this oil can be used, without risk, for the supplying of oil to the points to be lubricated on the printing press.

Because of a removable mounting of the small oil tank in the larger tank, if water occurs in the collected lubrication oil in the small tank, only a small quantity of make-up oil is needed to replace the used-oil for recycling. Since the water collects in the lower part of the smaller oil tank and, due to gravity, the oil always floats on the water, the present invention provides an assurance that, generally, no water can escape from the smaller oil tank into the larger tank.

The signal supplied by the sensor in the smaller oil tank can advantageously be used to disable the drive to the pump which pumps oil from the oil collecting tank to the central oil supply, with the result that no additional oil will be fed from the collection tank to the central lubrication system. Moreover, a warning signal can be generated to alert an operator of the printing press, who can then locate and seal the leakage point in the coolant line or system. Since a float is preferably provided in the larger tank, it is possible to switch on the pump, thereby, pumping oil from the collection tank to the central oil supply for a short time only when the oil level in the oil-collection tank has reached a defined maximum mark or level.

In summary, the present invention is directed to a process for monitoring the presence of appreciable water in a central lubricating system of a rotary printing press. Oil that escapes from bearings of the press is collected and fed to a small tank which, when filled, flows into a large tank. In the small tank, there is a water sensor that functions to disable a pump that returns oil from the large oil tank to the central lubrication system. Provided in the large tank is, preferably, a float that is adapted to turn on the oil pump when a certain level of oil is reached in the large tank. When the oil is pumped from the large tank, the float falls and thus turns off the pump.

The water sensor is preferably mounted in the small tank in a manner which permits easy removal from the tank so that the sensor can be cleaned and quickly reinstalled in the small tank.

In summary, one aspect of the invention resides broadly in a process for monitoring lubricating oil for water in a rotary printing press, supplying the oil to rotary printing presses from a central supply of the oil, collecting the oil escaping from the bearing points of the printing press, feeding the oil to the connecting lines to large oil collection tanks. The large collection tanks contain a small tank which is located for receiving the oil from the printing presses. When filled with oil, the oil from the small tank overflows into the large tank. A water sensor is provided in the small tank for generating a signal which disables the pump and generates an alarm when water in the small tank reaches a defined level. When water in the small tank has not reached the defined level, a pump is provided for pumping the oil in the large tank to the central supply of oil. A float is used in the large tank to start the pump when the oil in the large tank reaches a defined level.

Another aspect of the invention resides broadly in a process for monitoring lubricating oil for water content in a rotary printing press including feeding the oil from a supply of oil for the rotary printing press to the bearings of the rotary printing press and directing the oil that escapes from the bearings of the rotary printing press to a first tank. When the first tank receives a predetermined amount of oil, it is transferred into a second tank where it is pumped to the supply of oil in which a warning signal is generated if water is sensed in the predetermined amount of oil in the first tank.

Yet another aspect of the invention having apparatus for monitoring oil for water content in a rotary printing press is a central supply of oil for supplying oil to a plurality of locations of the rotary printing press, connecting the supply of oil for the rotary printing press to bearings of the rotary printing press and directing the oil escaping from the bearings to a first tank. In the first tank, there is means for sensing water which generates a signal indicating if a predetermined amount of water is in the first tank. The second tank receives oil from the first tank when the first tank receives a predetermined amount of oil. A pump for pumping oil in the second tank to the central supply of oil has a means for curtailing the pumping of the oil into the second tank upon receipt of the signal which indicates a predetermined amount of water is in the first tank.

BRIEF DESCRIPTION OF THE DRAWINGS

A specimen embodiment of the invention is diagrammatically represented in the accompanying drawings in which.

DESCRIPTION OF THE PREFERRED EMBODIMENTS

Figure 1:
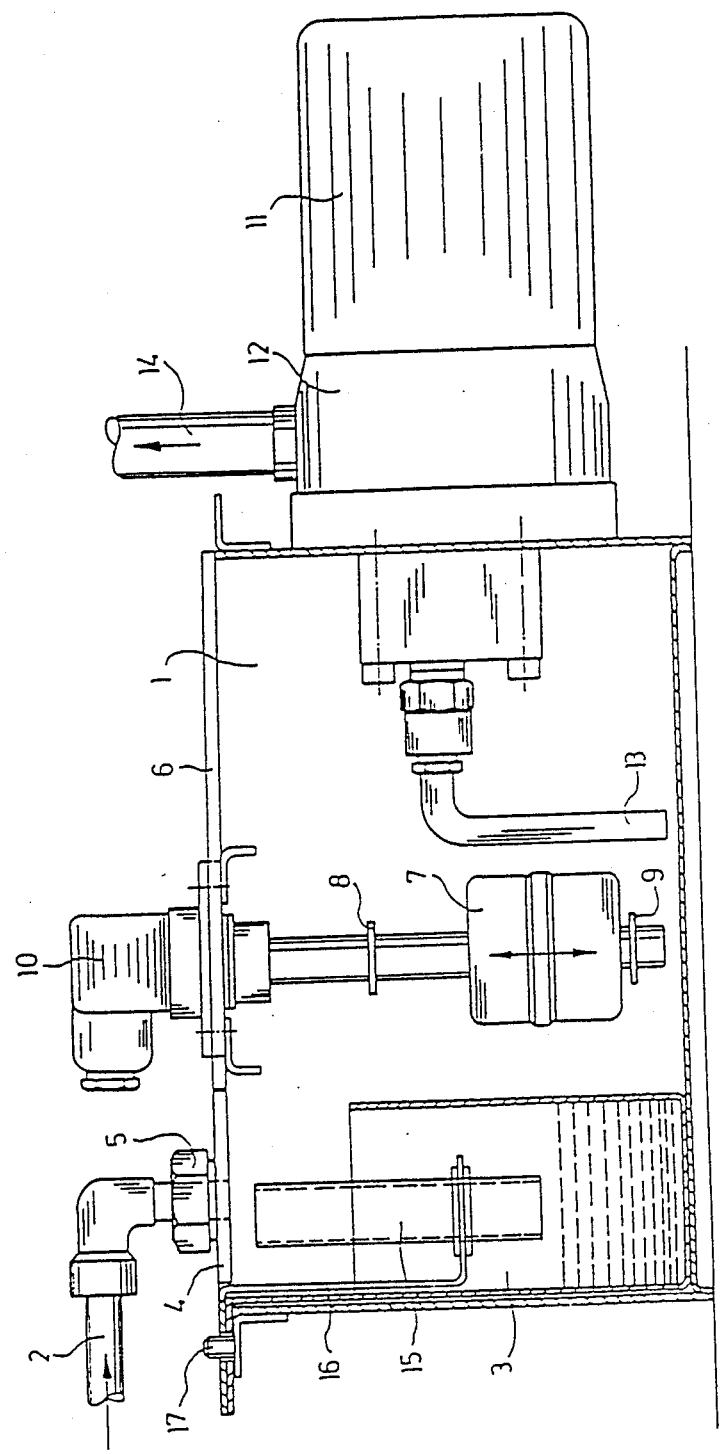
FIG. 1 shows an arrangement for monitoring water in lubricating oils in accordance with principles of the invention.

Referring now to FIG. 1, an oil-collection tank 1 is provided, for example, preferably, on the operator side of a rotary printing press preferably in the region of the printing units. This oil-collection tank is supplied via a connection line 2 with the lubrication oil that escapes from bearing points in the printing press. In the embodiment of the invention shown, in FIGS. 1 and 2, a smaller oil tank 3 is provided inside oil-collection tank 1. The oil supplied via the connection line 2 flows into the smaller oil tank 3. The small oil tank is removable from the oil-collection tank 1, for which purpose a lid 4 is provided. Connection line 2 is attached to this lid 4 by means of a suitable connector sleeve 5. After the lid 4 is removed from connection line 2, the smaller oil tank 3 can be taken out in order to clean and remove water from the smaller oil tank 3.

The oil supplied by connection line 2 fills the small oil tank 3 until the latter overflows. The oil that overflows from the small oil tank 3 is then collected by larger oil-collection tank 1. Supported in the cover 6 of tank 1 is preferably a float 7 or some other level detection arrangement. As shown, the float 7 has an upper switching position 8 and a lower switching position 9. When the oil in the tank 1 rises and float 7 makes contact with the upper switching position 8, an electrical signal is generated, which is supplied through a signal box 10 to a control device in a motor 11. This device switches on a motor 11, which drives a pump 12. By means of a continuous pumping suction line 13, the pump 12 pumps the oil out of the tank 1 until the level of oil in the tank lowers to float 7 and thereby making contact with the lower switch position 9. Consequently, the motor 11 is switched off as a result of a further signal generated by the lower switch position 9. A line 14 conducts the oil pumped out of tank 1 to a central oil-supply system 30 (FIG. 2).

Should the lubrication oil supplied through the connection line 2 contain water, which might happen, for example, as a result of a leak in a cooling-water line, the water will collect in the lower region of the oil tank 3. If the leak entails just a few drops of water, these drops may remain in the oil tank 3 over a lengthy period of time without there being any detriment to the system. If, however, the quantity of water in the oil tank 3 rises to a predefined level, a sensor 15 generates a signal that disables the circuit of the motor 11 (as discussed below) and that simultaneously generates a warning signal, e.g., preferably, in the machine-operator area, so that the printer, or other personnel, is able to detect and remedy the potentially damaging situation in the water supply. The small oil tank 3 is then emptied and the system is returned to normal operation.

Figure 2:
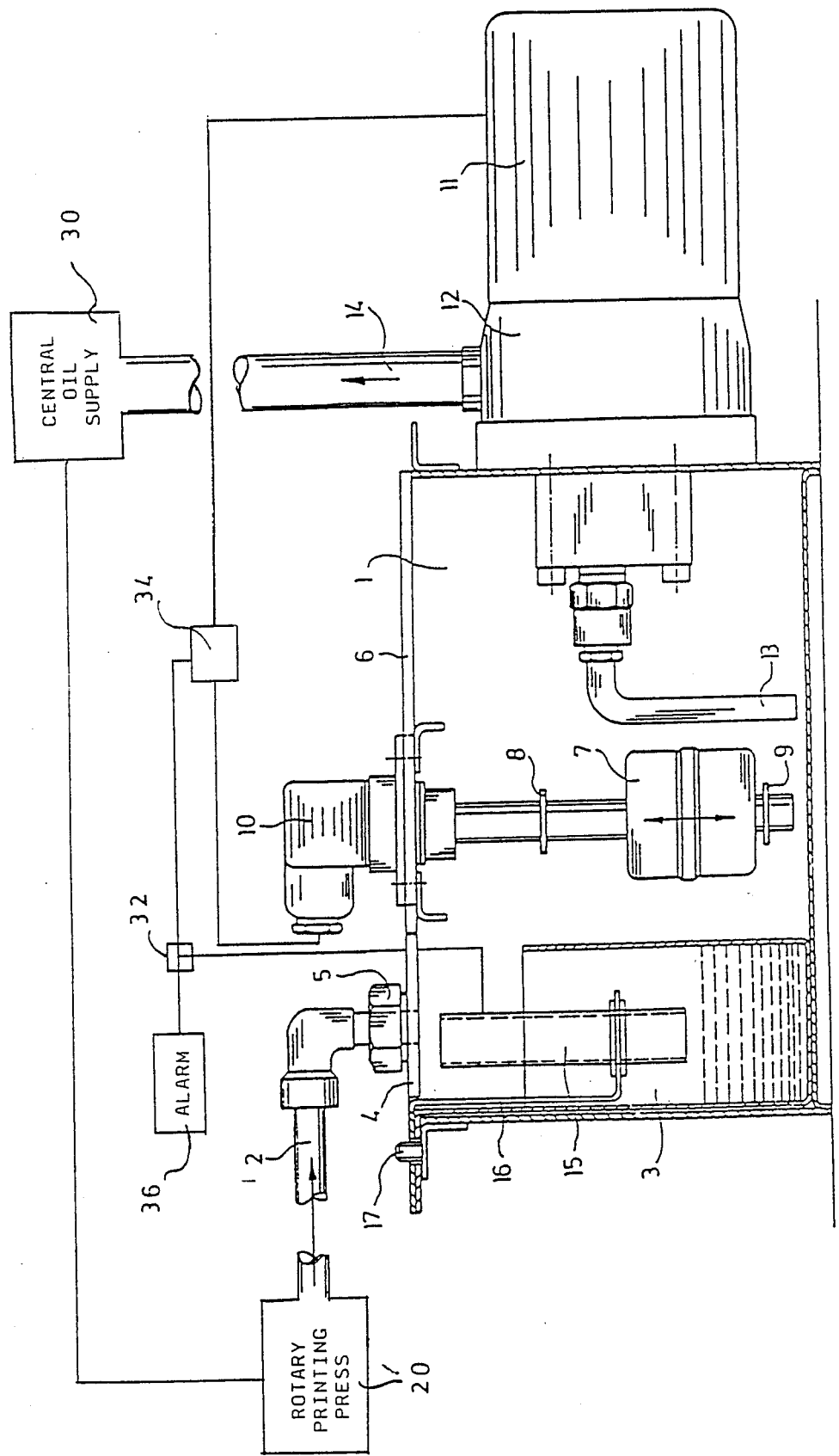
FIG. 2 is the arrangement of FIG. 1 showing, in addition, electrical circuit components and connections for effecting oil pumping disabling and alarm functions of the invention.

Referring now to FIG. 2 of the drawings, a suitable sensor for detecting the presence of water in tank 3 comprises two concentrically located spaced apart tubes connected to the respective poles of a low voltage power supply, to provide a low voltage differential between the tubes. When water rises in tank 3 to a height that reaches the lower end of the concentric tubes, current begins to flow between the tubes. As the water rises above the lower end of the tubes, current flow reaches a threshold value sufficient to operate a sensor circuit 32. Sensor circuit 32 is connected to operate a relay or switch 34 to open the circuit that otherwise energizes motor 11 when signal box 10 calls for pump 12 to pump oil from large tank 1. Sensor circuit 32 also, preferably, operates to simultaneously energize an alarm device 36.

Figure 3:
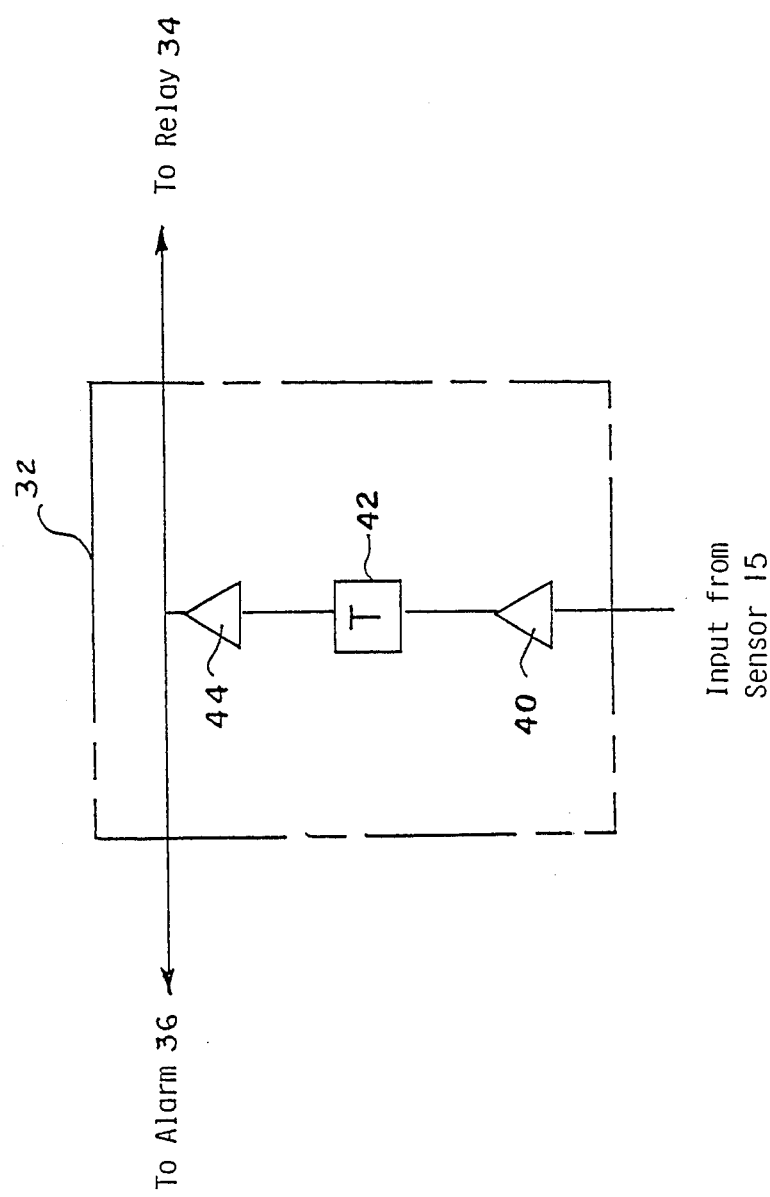
FIG. 3 is a diagram of a threshold circuit employed in the invention.

FIG. 3 diagrammatically depicts a sensor circuit 32. More particularly, sensor circuit 32 comprises an amplifier 40, a threshold circuit 42 and a second amplifier 44. The signal from the sensor 15 in large tank 1 is directed to the amplifier 40. Amplifier 40 then amplifies the signal to insure proper operation of the threshold circuit 42. The threshold circuit 42 is designed and constructed to output a signal when the current signal from the sensor 15 reaches a predetermined level. As discussed earlier, the amount of current flow in sensor 15 depends on the amount of water in small tank 3.

When threshold circuit 42 produces an output signal, amplifier 44 amplifies this signal to insure a signal level is available sufficient to operate relay 34 and alarm 36.

Water sensing devices in smaller tank 3 other than that of sensor 15 can be used, such as shown in Massagatti U.S. Pat. No. 4,367,440. What is generally provided in the present invention is, however, the ability to disable the circuit that delivers the energizing output of signal box 10 to motor 11 and provide an alarm.

When sensor 15 in the small tank is not activated, and the oil in the large tank 1 causes the float to rise to upper switch position 8 and energize signal box 10, oil is pumped by pump 12 into conduit 14. Conduit 14 is connected to the central oil supply 30, as shown in FIG. 2 and discussed above. From the central oil supply, oil is pumped to collection exemplary points 50, 52, 54 and 56 (FIG. 4) that direct the oil to bearings and other components of rotary printing presses 20 that need lubrication. Such printing presses are shown and discussed in German Pat. No. 27 28 738, published Jan. 11, 1979. As explained earlier, any substantial amount of oil escaping from the bearings of the presses is directed to small tank 3 via conduit 2.

Figure 4:
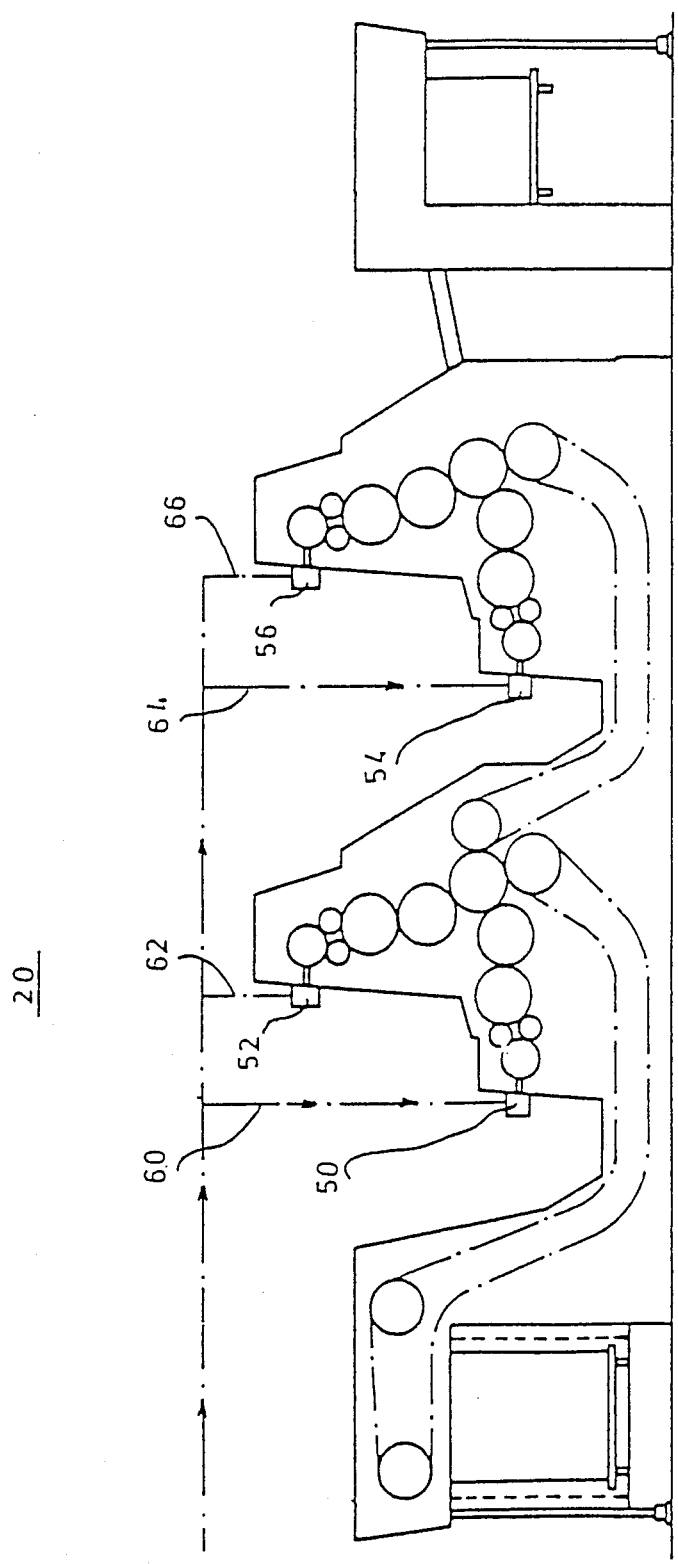
FIG. 4 is a diagrammatic representation of rotary printing presses having bearing points supplied with oil.

FIG. 4 of the drawings shows four oil supply lines 60, 62, 64 and 66 feeding oil to the exemplary collection points of the rotary printing presses. From the bearings and other components, oil is collected and fed to small tank 3 by means well known in the prior art.

Referring again to FIG. 2, the sensor 15 is shown attached to a bracket 16, which, in turn, is disposed by means of a pin 17 on the oil-collection tank 1 and into which the bracket 16 is to be mounted with the sensor 15. Consequently, the sensor 15 can easily be removed, for example for cleaning.

One feature of the invention resides broadly in a monitoring process on machine assemblies with central lubrication in rotary printing presses, characterized in that the lubrication oil supplied from the bearing points is collected at the machine assemblies and is fed by connecting lines 2 to an oil-collection tank 1. The oil, however, is first conducted into a smaller oil tank 3, from which, after the latter is filled, overflows into tank 1. Means for supplying a signal is provided in the smaller oil tank 3 if there is an occurrence of water in the oil fed to the smaller oil tank. The oil that has overflowed into the tank 1 is supplied by a connecting line 14 to the central oil supply 30.

Another feature of the invention involves implementation of the water monitoring process for machine assemblies, characterized in that a central oil-collection tank is assigned to a rotary printing press, with a smaller oil tank 3 being located in the central tank in oil-collection tank 1. A sensor 15 for water detection is provided in the smaller oil tank and a pump 12 is employed to pump oil from the oil-collection tank.

Yet another feature of the invention uses sensor 15 to withhold a signal until a defined level of water has been reached in small oil tank 3. When the signal is produced it disables the circuit of pump 12 and simultaneously generates a warning signal for the operator.

A further feature of the invention includes a float 7 provided in oil-collection tank 1, said float switching on pump 12 when a defined level of oil has been reached in tank 1.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The invention as described hereinabove in the context of the preferred embodiment is not to be taken as limited to all of the provided details thereof, since modifications and variations thereof may be made without departing from the spirit and scope of the invention.

What is claimed is:

1. The process for monitoring lubricating oil for water in a rotary printing press comprising:
   supplying oil to rotary printing presses from a central supply of the oil;
   collecting oil escaping from bearing points of the printing press;
   feeding said oil by connecting lines to large oil collection tanks, in which a small tank is located for first receiving the oil from the printing presses;
   feeding the oil from the small tank by overflowing the oil in a small tank into the large tank when the small tank is filled with oil;
   providing a water sensor means in the small tank;
   using said water sensor for generating a signal upon water in the small tank reaching a defined level;
   providing a pump for pumping oil in the large tank to the central supply of oil when water in the small tank has not reached the defined level;
   using said signal to disable the pump and to generate an alarm when water reaches the defined level; and
   using a float in the large tank to start the pump when the oil in the large tank reaches a defined level.

2. A process for monitoring lubricating oil for water content in a rotary printing press comprising:
   feeding said oil from a supply of oil for the rotary printing press to bearings of the rotary printing press;
   directing oil that escapes from said bearings of the rotary printing press to a first tank;
   transferring oil received in the first tank into a second tank when the first tank receives a predetermined amount of oil;
   pumping oil in the second tank to the supply of oil;
   sensing if water is present in a predetermined amount in said first tank; and
   generating a warning signal if water is sensed in said predetermined amount in the oil in said first tank.

3. The monitoring process of claim 2 including utilizing the signal to stop the pumping of the oil from the second tank.

4. The monitoring process of claim 3 including using said signal to provide an alarm.

5. The monitoring process of claim 4 including generating a signal only when a predetermined level of water is reached in the first tank.

6. A rotary printing press having apparatus for monitoring oil for water content in a rotary printing press comprising:
   a central supply of oil for supplying oil to a plurality of locations of the rotary printing press;
   means connecting said supply of oil for the rotary printing press to bearings of the rotary printing press;
   means for directing oil escaping from said bearings of the rotary printing press to a first tank;

means for sensing water in said first tank and generating a signal for indicating if a predetermined amount of water is in said first tank;

a second tank located to receive oil from the first tank when the first tank receives a predetermined amount of oil;

a pump for pumping oil in the second tank to the central supply of oil; and means for curtailing said pump from pumping of oil out of said second tank upon receipt of said signal indicating that a predetermined amount of water is in said first tank.

7. The apparatus of claim 6 in which the bearings are part of the bearings on which drums of the rotary printing press ride.

8. The apparatus of claim 7 in which the first tank is mounted in and removable from the second tank.

9. The apparatus of claim 8 in which float means is provided in the second tank, said float means being disposed to switch on the pump when a predetermined level of oil is reached in the second tank.

10. The apparatus of claim 9 in which the float means has upper and lower switching positions;

said float means comprising means for turning on the pump when the float rises to the upper position, and turning off the pump when the float descends to the lower position.

11. The apparatus of claim 5 including:

a sensing circuit connected to the sensing means in the first tank; and a disabling circuit connected between the sensing circuit and the pumping means, said sensing circuit having means for energizing the disabling circuit such that the pumping means is disabled when a predetermined level of water is reached in the first tank and for simultaneously generating an alarm signal.

* * * * *

UNITED STATES PATENT AND TRADEMARK OFFICE
CERTIFICATE OF CORRECTION

PATENT NO. : 4,967,880
DATED : November 6, 1990
INVENTOR(S) : Werner KRAMBS

It is certified that error appears in the above-identified patent and that said Letters Patent is hereby corrected as shown below:

In column 6, line 22, after 'in', delete "a" and insert --the--.

In column 6, line 22, after 'into', delete "the" and insert --a--.

Signed and Sealed this

Third Day of March, 1992

Attest:

HARRY F. MANBECK, JR.

Attesting Officer

Commissioner of Patents and Trademarks